United States Patent [19]

Saunders

[11] 4,427,872
[45] Jan. 24, 1984

[54] PRECISION MACHINING APPARATUS AND METHOD UTILIZING A LASER

[75] Inventor: Richard J. Saunders, San Jose, Calif.

[73] Assignee: Coherent, Inc., Palo Alto, Calif.

[21] Appl. No.: 944,868

[22] Filed: Sep. 22, 1978

[51] Int. Cl.³ .............................................. B23K 27/00
[52] U.S. Cl. ......................... 219/121 LH; 219/121 LJ
[58] Field of Search ..... 219/121 L, 121 LM, 121 EB, 219/121 EM; 29/620; 338/195

[56] References Cited

U.S. PATENT DOCUMENTS

| | | | |
|---|---|---|---|
| 3,375,342 | 3/1968 | Robinson | 219/121 EM X |
| 3,534,472 | 10/1970 | DeJong et al. | 29/620 |
| 3,569,660 | 3/1971 | Houldcroft | 219/121 LM |
| 3,916,144 | 10/1975 | Schuermann | 338/195 X |
| 4,065,656 | 12/1977 | Brown et al. | 219/121 LM |

Primary Examiner—C. L. Albritton
Attorney, Agent, or Firm—J. William Wigert, Jr.

[57] ABSTRACT

A method and apparatus for precision machining cylindrical workpieces is disclosed wherein a laser beam is directed at the workpiece tangent to or offset from a tangent to the workpiece. The workpiece is rotated about its longitudinal axis and, at the same time, the workpiece is scanned longitudinally of its axis by a laser beam.

27 Claims, 10 Drawing Figures

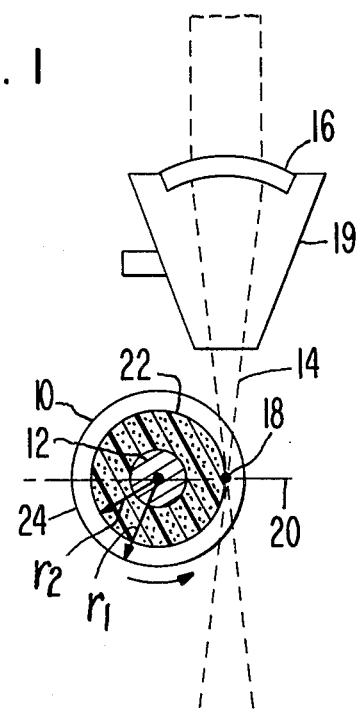
FIG. 1
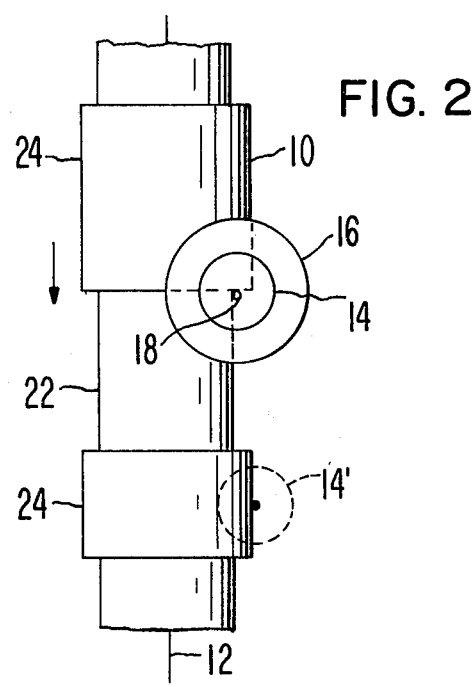
FIG. 2
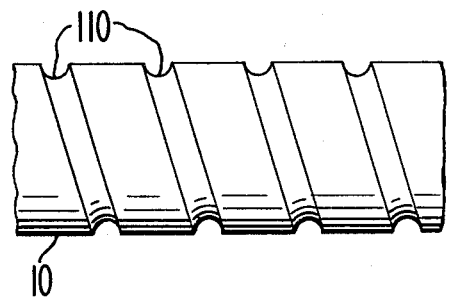
FIG. 7
FIG. 6A
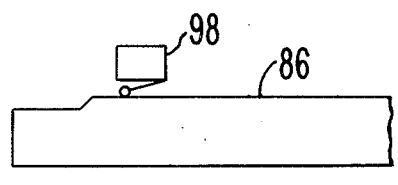
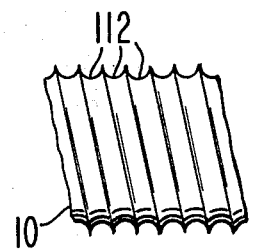
FIG. 8
FIG. 9
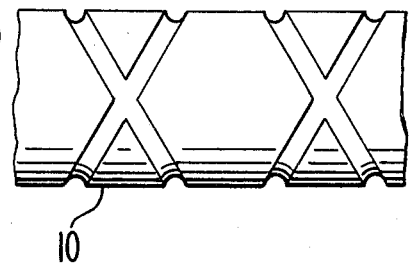
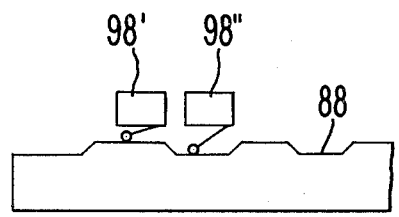
FIG. 6B

PRECISION MACHINING APPARATUS AND METHOD UTILIZING A LASER

BACKGROUND OF THE INVENTION

The present invention relates to a method and apparatus for precision machining utilizing a laser; and, more particularly, to precision machining the outside diameter of cylindrical workpieces.

The machining of the outside diameter of cylindrical workpieces is conventionally accomplished using mechanical equipment, such as grinders and cutters and lathes. The workpiece is rotated about its longitudinal axis and a cutting tool is brought in physical contact with the surface of the rotating workpiece to cut it down to the desired radius.

Conventional techniques have inherent limitations where high precision machining is required. The physical contact between the cutting tool and the workpiece causes distortion of the workpiece. For example, in the machining of low density polyurethane foam rollers, used in photocopier equipment, conventional mechanical grinders can only achieve tolerances to ±0.015 inches. Additionally, mechanical cutting devices, because they physically engage the surface of the workpiece, are subject to wear and tear, and need to be sharpened or replaced.

SUMMARY OF THE PRESENT INVENTION

It is therefore an object of the present invention to provide improved method and apparatus for machining the outside diameter of a cylindrical workpiece;

Another object of the invention is to provide an improved method and apparatus for machining the outside surface of a cylindrical workpiece where there is no physical contact between the cutting tool and the workpiece;

Another object is to provide an improved technique for machining a workpiece utilizing a laser.

In accordance with the present invention a laser beam is directed at a rotating cylindrical workpiece along a path which is tangent to, or offset inwardly from a tangent to the workpiece. The workpiece is rotated about its longitudinal axis and at the same time a laser beam traverses the workpiece along a path generally parallel to the axis of the workpiece. As it does so, it evaporates the workpiece material beyond the radius of the intersection of the laser beam and the rotating workpiece. Since the laser beam does the cutting, there is no mechanical contact with the workpiece being machined and little distortion of the workpiece occurs.

Cylindrical workpieces having sections with different diameters can be machined using the method and apparatus of the present invention. A first pass is made by the laser beam at a constant radius along the entire length of a rotating workpiece. This establishes the maximum radius of the workpiece. Next, the laser beam is offset towards the axis of the rotating workpiece and a second pass of the workpiece is made by the laser beam. In this case, however, the laser beam is selectively turned on and off. During the time that the laser is energized, the beam cuts the workpiece to a second smaller radius. During the time the beam is off, no cutting takes place and the workpiece maintains the radius established during the first pass.

By adjusting the radial distance of the laser beam from the longitudinal axis of the workpiece, and by making additional passes, the outside diameter of the workpiece can be machined to have sections with any desired radius.

The method and apparatus of the present invention can also be utilized to provide spiral grooves cut into the surface of a cylindrical workpiece. The laser beam is directed at the rotating workpiece in the manner described above. However, the ratio of the rotational velocity to the longitudinal velocity of the workpiece is reduced. In other words, the rotational speed of the workpiece is slowed down relative to the longitudinal movement of the workpiece. In this way, the entire circumferential surface of the workpiece is not cut by the laser beam as it traverses the length of the workpiece.

To illustrate the degree of precision which is possible using the laser machining technique of the present invention, tolerances of ±0.002 inches can be achieved in machining cylindrical rollers made of low density polyurethane foam.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a cross-sectional view of a cylindrical workpiece being machined in accordance with the present invention;

FIG. 2 is a top view of FIG. 1;

FIGS. 6A and 6B are views of a part of the cam assembly shown in FIGS. 3 and 4;

FIG. 7 is a view of a workpiece provided with grooves in accordance with the present invention;

FIG. 8 is a view of a workpiece provided with threads in accordance with the present invention; and FIG. 9 is a view of a workpiece provided with grooves in accordance with the present invention.

DESCRIPTION OF THE PREFERRED EMBODIMENTS

Figure 3:
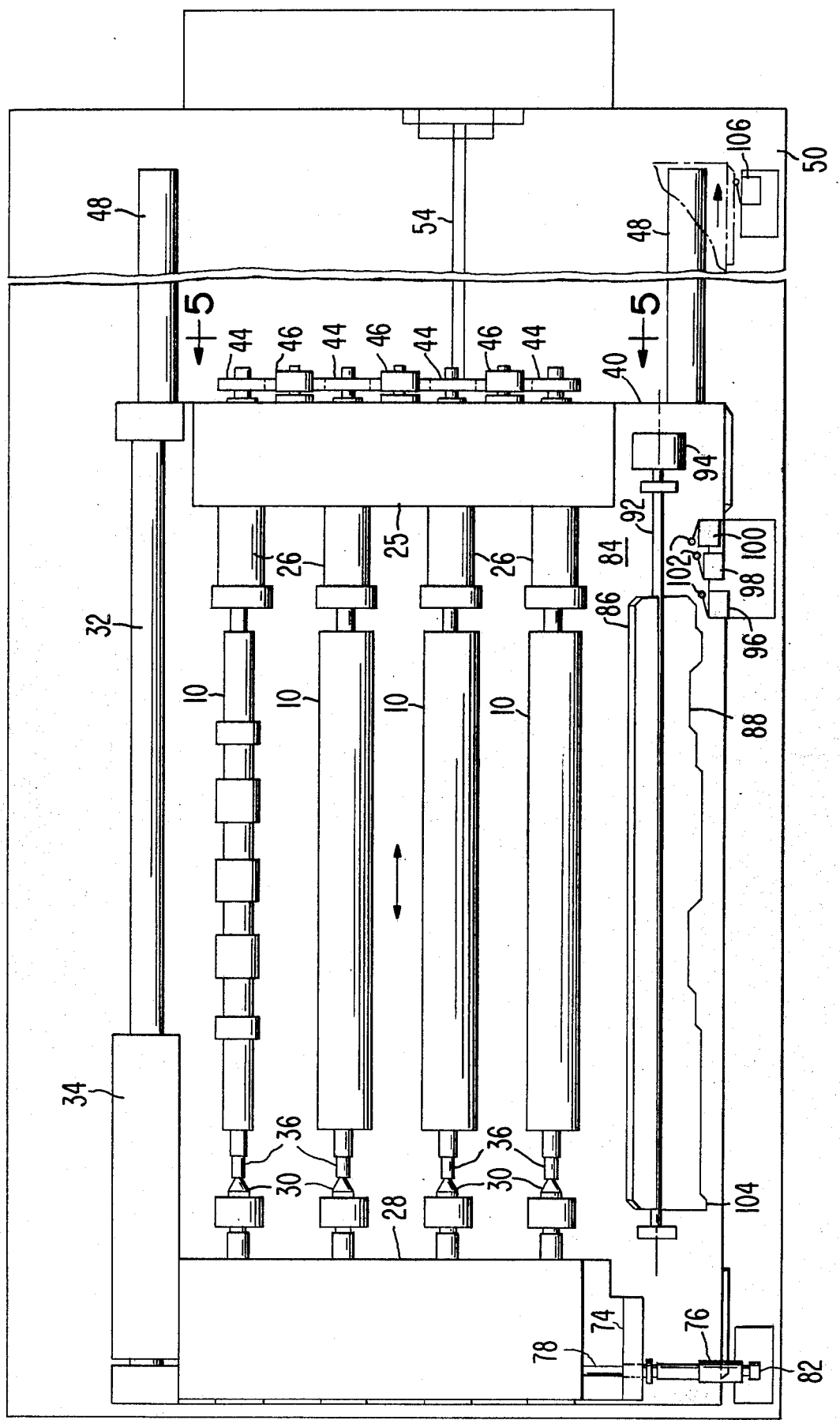
FIG. 3 is a top view of a laser machining apparatus of the present invention.

To understand the general principles of the present invention, reference is made to FIGS. 1 and 2. A cylindrical workpiece 10 which is rotated about a longitudinal axis 12, preferably in the direction indicated by the arrow in FIG. 1; into the path of laser beam 14. The diameter of laser beam 14 is exaggerated for purposes of illustration. In an actual application the width of the laser beam is quite narrow. A meniscus lense 16 focuses the laser beam 14, preferably to a focal spot 18 which is located at the center line 20 of the rotating workpiece 10. A coaxial gas jet nozzle 19 is provided for protection of the lense and also to prevent flaming of the vaporized material. Compressed air, nitrogen, or argon can be used to improve the quality of the cut. It is also possible to achieve the same results with an off axis gas jet.

The laser beam 14 is directed in a plane which is perpendicular to the axis 12 of the workpiece 10, where the workpiece 10 is to have sections of different diameters. The beam 14, shown in FIG. 1, is highly exaggerated for purposes of illustration. In the actual application the width of the laser beam is quite narrow. The beam is directed at the rotating workpiece offset from a tangent to the workpiece. Thus, as the beam passes through material being machined, it defines a chordal path through the workpiece. In terms of the cylindrical workpiece thus machined, the laser beam follows a path which is tangent to the machined workpiece.

A cylindrical workpiece is machined into sections having different radii as follows. The laser beam 14 is first directed at the rotating workpiece at a radius $r_1$. In many situations this will be close to the nominal radius of the workpiece. In other cases, this is at a radius which is less than that of the cylindrical stock. The workpiece is then traversed longitudinally along its axis 12 by the laser beam 14'. The laser beam is energized for the entire pass of the workpiece 10.

Thereafter, the laser beam is directed at the workpiece at a radius $r_2$ from the center line of the workpiece and a second pasds of the workpiece is made by the laser beam 14. The laser beam is energized during the longitudinal passage of the workpiece 10 during the pass of those sections 22 where the smaller radius $r_1$ is desired. In the sections 24 where the larger radius $r_1$ is desired, the laser beam is de-energized and no cutting action takes place.

In order for a precision cut to be made of the workpiece 10 free from unevenness or grooves, it is necessary for the workpiece 10 to be rotated quite rapidly. For example, in the machining of low density polyurethane foam rollers, it has been found that a typical rotational speed of 1,000 rpm is satisfactory at a longitudinal pass of the laser beam along the workpiece 10 of 5–30 inches per minute.

In the example shown in FIGS. 1 and 2, workpiece 10 is provided with sections 22 and 24 with two different radii. If additional sections are desired with yet additional radii, additional passes of the laser beam 16 can be made at the desired radius and with the laser beam energized during that portion of the pass of the laser beam where the section is desired.

While the workpiece 10 can be rotated in either the clockwise or counter-clockwise direction, it has been found that for most effective cutting, it is desirable to rotate the workpiece 10 in a direction "toward" the incoming laser beam 14. In FIG. 1, this corresponds to a counter-clockwise direction since the laser beam is coming from above in that Figure. The reason for this is that uncut stock is below the focal point 18 of the laser beam and can't "shadow" the laser beam or the point of focus.

Figure 5:
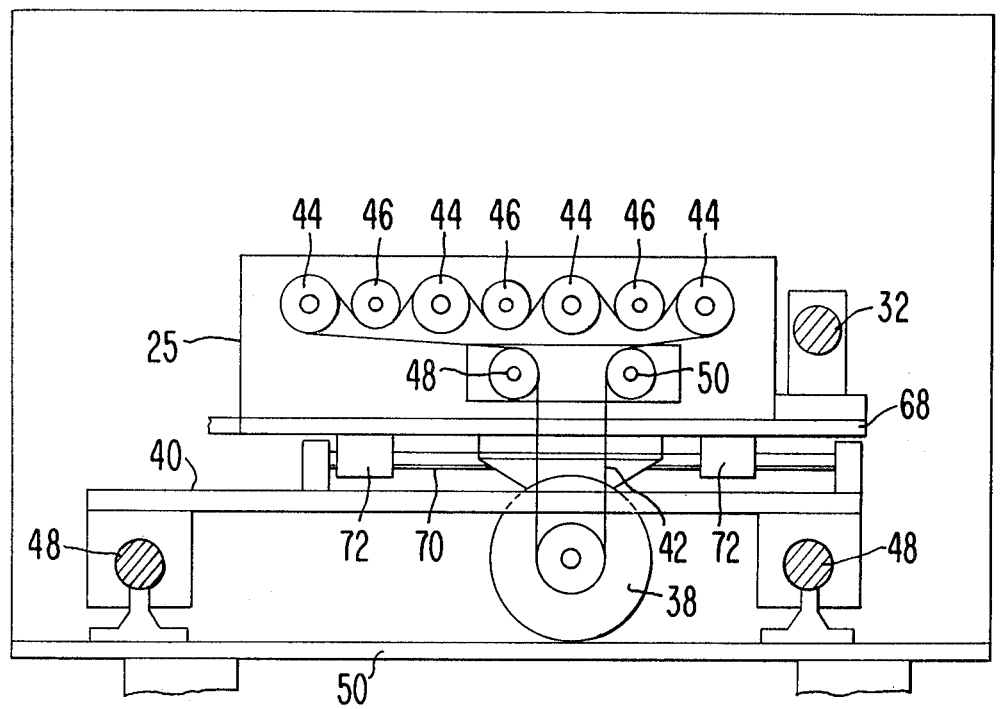
FIG. 5 is a sectional view of the machine of FIG. 3 taken at a point and in a direction indicated by the arrows in FIG. 3.
Figure 4:
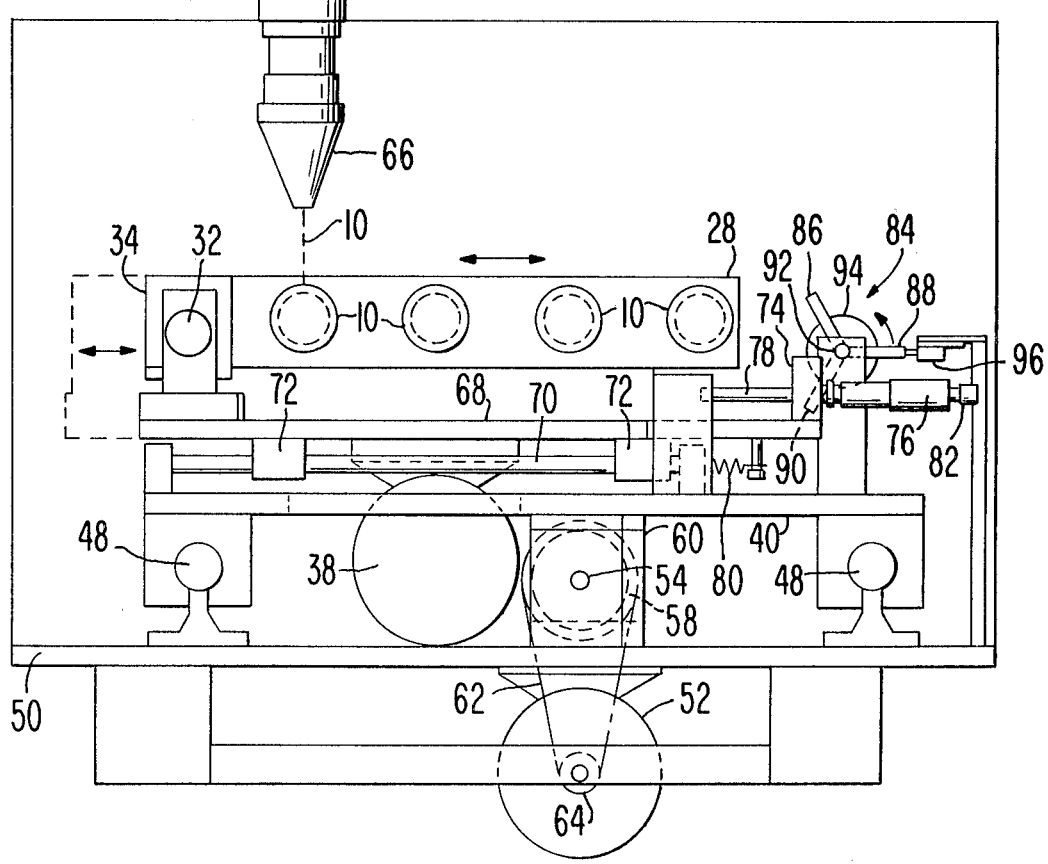
FIG. 4 is an end view of the machine of FIG. 3 in the directions indicated by the arrow.

An actual embodiment for carrying out the principles of the present invention is shown in FIGS. 3, 4 and 5. In the apparatus shown, four workpieces 10, each having a central spindle 36, are each supported at one end by a chuck 25 comprising a plurality of chuck holders 26 and at the opposite end by tail stock 28 which comprises a plurality of workpiece support members 30. Tail stock 28 is movably supported on a way 32 by means of member 34 which is secured to the tail stock 28 and which slides along the tail stock way 32. Each of the workpieces 10 is loaded into the chuck 25 by manually moving the tail stock 28 into engagement with each of the spindles 36.

FIG. 5 illustrates the manner in which the workpieces 10 are rotated about their longitudinal axis. A motor 38 is supported along the bottom of workpiece support carriage 40. Motor 38 drives a pulley belt 42 which is threaded between pulley wheels 44, connected to the shafts of the chuck holders 26, and a series of three rollers 46 placed between the four pulley wheels 44 to insure frictional engagement with each of the pulley wheels 44. Additionally, guide rollers 48 and 50 provide help to insure maximum frictional engagement with the pulley wheels 44.

As best seen in FIGS. 3 and 5, the workpiece support carriage 40 moves in a direction parallel to the rotational axes of the workpiece 10 on a pair of ways 48. Each of the ways 48 is mounted to frame 50. Also supported on frame 50 is a motor 52. Motor 52 drives a lead screw 54. Lead screw 54 is terminated by a pulley wheel 58 which in turn is supported by a frame 60 attached to the frame 50. A pulley belt 62 between a smaller pulley wheel 64 and the larger pulley wheel 58 drives the lead screw 54. The opposite end of lead screw 54 is supported by, and moves, the workpiece support carriage 40 along the ways 48.

The manner in which the laser beam is positioned radially of the axis of each of the workpieces 10 is best seen by reference to FIGS. 4 and 5. In FIG. 4, a gas jet nozzle 66 supports a beam focusing lense (not shown). The nozzle 66, as well as the laser, are stationarily mounted to a machine frame (not shown). The tail stock 28 and the chuck 25 are mounted on a support 68 which, in turn, is mounted at each end to a way 70 by a pair of guides 72 which permit the support 68, and hence the workpieces 10 to move in a direction lateral to the longitudinal axis of each of the workpieces 10.

An L-shaped bracket 74 supports a micrometer 76 having a rotatable shaft 78 and a biasing spring 80. The biasing spring 80 is mounted to bias the support 68 in a direction to engage the shaft 78 of micrometer 76. As the micrometer shaft 78 is manually rotated by micrometer knob 82, the spring 80 urges the frame 68 supporting workpieces 10 toward and into engagement with the micrometer shaft 78. Since the laser beam 10 emanating from nozzle 66 is stationarily mounted, the arrangement just described enables the laser beam 10 to be set at any radial distance from the axis of each of the workpieces 10.

The laser is energized and de-energized by a cam assembly 84, shown in FIGS. 3 and 4. Cam assembly 84 comprises a turret arrangement a cam blades 86, 88 and 90 mounted radially to a hub or shaft 92. The shaft 92 is rotated by a cam motor 94. Cam motor 94 rotates the cam blades 88 such that one cam blade 88 is aligned with a plurality of micro switches 96, 98 and 100, which are each turned on and off by the action of a cam follower 102 which engages the cam surface of the respective cam blades 86, 88 and 90.

In operation, the lead screw motor 52 rotates the lead screw 54 and moves the workpiece carriage 40 along ways 48. A micro switch 98 through its cam follower 102, follows the contour of the cam blade aligned with it. Depending upon the particular contour of the cam blade in position with the micro switches, the laser is energized and de-energized in a predetermined fashion.

A second micro switch 96, is offset radially from micro switch 98 and is positioned in a way such that its cam follower 102 only contacts an end portion 104 of each of the cam blades. It acts as a return switch to return the workpiece carriage 40 back to its initial position at the end of a pass of the laser beam. A third micro switch 100 serves as a switch to the lead screw motor to control the speed of the lead screw between a low speed, during which the laser cuts the workpiece, and a high speed when the workpiece is brought into position to be cut by the laser and during the time period that the carriage is returned to its initial position. An additional micro switch 106 is provided (FIG. 3) and it acts as a limit switch.

A more detailed view of the engagement of the on and off micro switch 98 and the cam blades is shown in FIGS. 6A and 6B. In FIG. 6A, the cam blade 86 has a flat surface and is used to make the initial pass along the workpiece 10 to create a precision outside diameter. In FIG. 6B, the cam motor 94 has rotated the cam blade assembly such that cam blade 88 is in alignment with the micro switch 98. In the first position of the cam, indicated by 98', the surface of the cam 88 causes the laser to be energized. Since the laser has been reset to a smaller radius, this results in a section of the workpiece cut to a smaller radius, such as section 22 in FIG. 2. In the position of the micro switch indicated by 98", the cam surface causes the cam follower to turn off the micro switch 98' and this deenergizes the laser so that the original radius of the workpiece remains. This corresponds to section 24 of workpiece 10 in FIG. 2.

In the particular embodiment described, the laser beam is held stationary and the workpiece is moved relative to the laser beam in order to traverse the workpiece with the laser beam. It is apparent that there are other ways to traverse the laser beam along the workpiece. For example, the workpiece could be held stationary and either the laser is moved along the axis of the workpiece or the laser beam is moved along the workpiece. Similarly, while in the embodiment described above the laser is energized and de-energized by the cam assembly, a suitable shutter arrangement can be provided for selectively causing the laser beam to impinge on the workpiece, with the laser operating continuously.

The present invention can be used to machine many types of materials. It is required that the particular workpiece being machined be absorbent of the particular wavelength of the laser beam. In the particular embodiment described herein for machining low density polyurethane foam rollers, a $CO_2$ laser was employed providing a hundred watts of power to the workpiece. The lense focusing the beam on the workpiece was a meniscus lense having a five inch focal length. Other materials which are absorbent of a laser beam from a $CO_2$ laser include many plastics, rubber, and wood materials.

FIGS. 7, 8 and 9 show various groove and thread patterns which may be provided in the workpiece 10 by modifying the rotational and/or longitudinal velocity of the workpiece. Specifically, the rotational velocity is reduced relative to the longitudinal traverse rate. In FIG. 7, a screw or groove pattern is provided with substantial spacing between the center lines of the groove. For example, if a one inch pitch is provided between grooves 110 in FIG. 7, the combination of a rotational speed of the workpiece 10 of 140 rpm and a beam traverse rate of 140 inches per minute would provide that pattern.

In FIG. 8, the grooves 112 are side by side to form a screw pattern. If, for example, the pitch of the grooves 112 is at one-quarter inch centers, this pattern can be created by rotating the workpiece 10 at 560 rpm and sweeping the laser beam along the workpiece at 140 inches per minute. Obviously, in the case of both FIGS. 7 and 8, many other combinations of rotational speeds and longitudinal velocities will produce the same result.

In FIG. 9, the cross-groove pattern shown therein is provided by cutting with the laser beam first in one direction and then subsequently in a second rotational direction.

In the case of a polyurethane foam workpiece, it had been found that, ideally, reducing the radius by 0.050 inches per pass is ideal to prevent fusion and to keep the surfaces smooth. Of course, greater amounts of material can be removed and the amount of material which is satisfactorily removed during each pass will depend on not only the material being machined, but also on the characteristics of the laser and optical delivery system.

Where sections with different diameters are not required, it is not necessary for the laser beam to be in a place perpendicular to the axis of the workpiece. In fact, when a uniform diameter workpiece is desired, it is best to incline the beam in the direction of the traverse. This provides an excellent cut without the "shadowing" effect caused by the uncut portion of the workpiece on the laser beam at its focal point.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. Apparatus for machining the outside diameter of a generally cylindrical workpiece comprising:
   a laser;
   support means for axially engaging the cylindrical workpiece and rotating the workpiece about its axis;
   delivery means for directing the output beam from said laser along a chordal path through the rotating workpiece and wherein said delivery means includes means for directing the laser beam in a plane perpendicular to the axis of the workpiece;
   means for moving the laser beam relative to the workpiece in a direction parallel with the rotational axis of the workpiece whereby material from the rotating workpiece is removed by the action of the laser beam; and
   means for selectively energizing and de-energizing said laser to selectively cut the workpiece to form non-uniform outside diameters along the length of the workpiece.

2. Apparatus as in claim 1 including means to alter the rotational speed of the workpiece relative to the speed of the laser beam across the workpiece.

3. Apparatus as in claim 1 wherein said delivery means includes means for varying the radial distance of the laser beam from the workpiece axis to machine the workpiece within a range of diameters.

4. Apparatus as in claim 3 including means for providing a gaseous jet at the workpiece in the vicinity of the area being machined.

5. A method of machining a workpiece having cylindrical sections of at least two different diameters comprising the steps of:
   (a) rotating the workpiece about its axis;
   (b) directing the output of a laser in a plane perpendicular to the axis of the rotating workpiece and offset from and parallel to a tangent to the workpiece in a direction to intersect the workpiece;

(c) passing the laser beam along the entire workpiece in a direction parallel to the axis of the rotating workpiece to remove material from the workpiece beyond a first radius equal to the distance from the laser beam to the rotational axis of the workpiece;

(d) offsetting the laser beam closer to the axis of the rotating workpiece at a smaller radial position;

(e) passing the laser beam along the workpiece in a direction parallel to the axis of the rotating workpiece; and (f) selectively energizing the laser to remove material from the workpiece where it is desired to have a section with the smaller radius and de-energizing the laser when it is not.

6. A method as in claim 5 including the additional steps of repeating steps (d) through (f) where a different radial section is desired.

7. A method as in claim 5 including the additional step of directing a gaseous jet at the workpiece where the laser beam intersects the workpiece.

8. A method of machining the outside diameter of a cylindrical workpiece comprising the steps of:
rotating the workpiece about its axis;
directing the output of a laser in a plane perpendicular to the axis of the rotating workpiece and offset from and parallel to a tangent to the workpiece in a direction to intersect the workpiece;
passing the laser beam along the workpiece in a direction parallel to the axis of the rotating workpiece to remove material from the workpiece beyond a radius equal to the distance from the laser beam to the rotational axis of the workpiece; and
selectively energizing and de-energizing the laser to form a workpiece having cylindrical sections of different diameters.

9. A method as in claim 8 including the step of varying the offset of the laser beam to vary the diameter of the machined workpiece.

10. A method as in claim 8 including the step of providing an initial pass of the laser beam along the workpiece to form a cylindrical workpiece having a precise outside diameter.

11. A method as in claim 8 including the additional step of directing a gaseous jet at the workpiece where the laser beam intersects the workpiece.

12. Apparatus for machining the outside diameter of a generally cylindrical workpiece with groove and thread patterns comprising:
a laser;
support means for axially engaging the cylindrical workpiece and rotating the workpiece about its axis;
delivery means for directing the output beam from said laser along a chordal path through the rotating workpiece in a plane perpendicular to the axis of the workpiece;
means for moving the laser beam relative to the workpiece in a direction parallel with the rotational axis of the workpiece whereby material from the rotating workpiece is removed by the action of the laser beam; and
means to alter the rotational speed of the workpiece relative to the speed of the laser beam across the workpiece to provide groove patterns thereon.

13. Apparatus as in claim 12 wherein said delivery means includes means for rotating the workpiece towards the incoming laser beam.

14. A method of working the outer periphery of a workpiece using a laser beam, comprising the steps of:
rotating a workpiece;
irradiating the workpiece at a point of irradiation with a laser beam oriented tangential to the workpiece to effect melting the workpiece in the area of irradiation,
removing the melt, and
shifting the point of irradiation in the direction of the axis of rotation of the workpiece.

15. A method as defined in claim 14 including the step of moving the point of irradiation inwardly toward the center of the rotation of the workpiece.

16. A method as defined in claim 14 wherein the step of removing the melt is effected by the application of a jet of gas thereto.

17. Apparatus for machining the outside diameter of a generally cylindrical workpiece comprising:
a laser;
support means for axially engaging the cylindrical workpiece and rotating the workpiece about its axis;
delivery means for directing the output beam from said laser along a chordal path to the rotating workpiece; and
means for moving the laser beam relative to the workpiece in a direction parallel with the rotational axis of the workpiece whereby material from the rotating workpiece is removed by the action of the laser beam.

18. Apparatus as in claim 17 wherein said delivery means includes means for rotating the workpiece towards the incoming laser beam.

19. Apparatus as in claim 17 including means for focusing the laser beam to a focal point at the center line of the workpiece.

20. Apparatus as in claim 17 including means to alter the rotational speed of the workpiece relative to the speed of the laser beam across the workpiece.

21. Apparatus as in claim 17 wherein said delivery means includes means for directing a laser beam in a plane perpendicular to the axis of the workpiece.

22. Apparatus as in claim 21 including means for selectively energizing and de-energizing said laser to selectively cut the workpiece to form non-uniform outside diameters along the length of the workpiece.

23. Apparatus as in claim 22 wherein said delivery means includes means for varying the radial distance of the laser beam from the workpiece axis to machine the workpiece within a range of diameters.

24. Apparatus as in claim 17 including means for providing the gaseous jet at the workpiece in the vicinity of the area being machined.

25. Apparatus for machining the outside surface of a cylindrical workpiece comprising:
means for rotating a workpiece along its longitudinal axis; and
means for traversing the laser cutting beam along the rotating workpiece with the laser beam maintained in a chordal path through the workpiece.

26. A method of machining the outside surface of a cylindrical workpiece comprising the steps of:
rotating a workpiece about its longitudinal axis; and
traversing a laser cutting beam along the rotating workpiece with the laser beam being maintained in a chordal path through the workpiece.

27. A method of machining the outside diameter of a cylindrical workpiece comprising the steps of:

rotating the workpiece about its axis;
directing the output of a laser in a plane perpendicular to the axis of the rotating workpiece and offset from and parallel to a tangent to the workpiece in a direction to intersect the workpiece; and
passing the laser beam along the workpiece in a direction parallel to the axis of the rotating workpiece to remove material from the workpiece beyond a radius equal to the distance from the laser beam to the rotational axis of the workpiece.

* * * * *